United States Patent
Visenzi

(10) Patent No.: US 6,481,605 B1
(45) Date of Patent: Nov. 19, 2002

(54) MOTORBIKE TRANSPORT CASE COMPRISING A RELEASABLE HANDLE LOCK

(75) Inventor: Vincenzo Visenzi, Rezzato (IT)

(73) Assignee: GI., VI S.r.l., Flero (IT)

( * ) Notice: Subject to any disclaimer, the term of this patent is extended or adjusted under 35 U.S.C. 154(b) by 0 days.

(21) Appl. No.: 09/713,914

(22) Filed: Nov. 16, 2000

(30) Foreign Application Priority Data

Nov. 22, 1999 (EP) .............................. 99123097

(51) Int. Cl.$^7$ ................................. B62J 9/00
(52) U.S. Cl. ................. 224/435.05; 190/117; 206/335; 224/413; 224/428; 224/433
(58) Field of Search ................ 224/435, 412, 224/423, 458, 413, 428, 433; 190/117; 206/335

(56) References Cited

U.S. PATENT DOCUMENTS 4,522,442 A * 6/1985 Takenaka .................... 224/435
5,439,149 A * 8/1995 Walter et al. ................ 224/435

FOREIGN PATENT DOCUMENTS

| DE | 4230972 A1 | 5/1993 |
| EP | 0517265 A2 | 12/1992 |
| EP | 0709282 A1 | 5/1996 |
| EP | 0709283 A1 | 5/1996 |

* cited by examiner

*Primary Examiner*—Stephen K. Cronin
*Assistant Examiner*—Maerena W. Brevard
(74) *Attorney, Agent, or Firm*—Summa & Allan, P.A.

(57) ABSTRACT

The invention relates to a detachable motorbike transport case (TC) comprising a bottom shell (1) and a top shell (2) hinged to the bottom shell (1). A locking mechanism (12*a*, 8, 31, 32, 39, 39*a*), preferably operable by a key (12), is arranged to selectively lock the top shell (2) to the bottom shell (1). A handle (18) is articulated to the transport case (TC) such as to be pivotable between a retracted position (FIG. 4) and a projecting position (FIG. 9).

In order to enhance the functionality, comfort and safety of the motorbike transport case, the locking mechanism comprises retaining means (11, 41) for retaining the handle (18) in the retracted position thereof, and the locking mechanism can assume a release state (90°) in which the retaining means (11, 41) release the handle (18) from the retracted position.

In this manner, the handle (18) cannot move inadvertently to its projecting position and the locked handle (18) cannot be moved to its projecting position by an unauthorized person. The unlocking operation can be utilized to concurrently eject the handle automatically to its projecting position which may provide access to a further control element (e.g. an opening push button 16) that may have been covered by the retracted handle (18).

89 Claims, 8 Drawing Sheets

MOTORBIKE TRANSPORT CASE COMPRISING A RELEASABLE HANDLE LOCK

The invention relates to a transport case comprising:
a base part arranged to be detachably fitted to a motorbike or a carrier plate mounted on a motorbike (the term "motorbike" as used in this specification encompasses motor scooters);
a lid part hinged to the base part such that the lid part can be pivoted away from the base part to open the transport case and pivoted toward the base part to close the transport case;
a locking mechanism, preferably operable by a key, said locking mechanism arranged to selectively assume a first state locking the lid part to the base part and a second state unlocking the lid part from the base part; and
a handle articulated to the transport case, in particular to the base part thereof, in such a manner that the handle can be pivoted between a retracted position and a projecting position.

A transport case of this type is described in EP-B1-0517 265. As has been well-known in the art, transport cases that can be fitted detachably to a motorbike provide versatility in that the user may employ such a case either separately from a motorbike, e.g. while walking as a pedestrian or working in an office, or in a fitted state, i.e, when driving a motorbike to which the transport case has been fitted so that the user does not have to hold the case manually.

While conventional detachable transport cases thus provide considerable convenience, it is an object of the application to further enhance the functionality, comfort and safety of motorbike transport cases.

According to the invention, this object is achieved by the following additional features:
the locking mechanism comprises retaining means for retaining the handle in the retracted position thereof, and
the locking mechanism is arranged to selectively assume a release state in which the retaining means release the handle from the retracted position thereof.

The additional features advantageously utilize the locking mechanism to fulfil a novel function in that the handle is selectively locked in its retracted position and released therefrom. The novel function provides a number of advantages, in particular as worked out below:

(a) The handle cannot move inadvertently to its position projecting from the transport case. A locked handle thus avoids traffic safety hazards that a projecting handle might present to pedestrians, for example, when the transport case has been fitted to a motorbike.

(b) The locked handle cannot be moved to its projecting position by an authorized person (because operation of the locking mechanism typically requires some special tool, mechanical key, combination code number, electronic key or the like). Therefore, the locked handle can be used as an additional means of protection against unauthorized opening and/or detachment of the transport case from a motorbike. For example, further control elements (e.g. an opening pushbutton) may be hidden behind the locked handle in the retracted position thereof.

(c) The locked handle may be selectively released operating the locking mechanism (with the help of a mechanical key, for example). When a legitimate user of the transport case (e.g. a user having such a key) operates the locking mechanism to unlock the handle, this unlocking operation can be utilized to concurrently eject the handle automatically to its projecting position.

In this manner, the user' comfort can be enhanced because the user can immediately grip the handle (without having to pull it out of its retracted position), and/or can immediately access any further control element (e.g. push button) that may have been covered by the retracted handle.

In the broadest aspect of the present invention, the release state of the locking mechanism may be identical to the second state thereof, i.e., the handle may be unlocked at the same time as the locking mechanism unlocks the lid part from the base part of the transport case.

In a presently preferred embodiment, however, the release state of the locking mechanism is a third state thereof, and the retaining means are arranged to retain the handle in the retracted position when the locking mechanism is in its first and second states. In other words, the locking mechanism preferably has a first state in which both the opening mechanism of the transport case and the handle are locked, a second state in which the transport case can be opened (without having to be opened) but the handle is still locked, and a third state in which the transport case can be opened (without having to be opened) and the handle is released, or unlocked.

A three-state locking mechanism provides enhanced versatility and separate control in that the user does not have to release the handle when he only wishes to open or detach the transport case. When the handle is in its projecting position, it can be pivoted back (to the retracted position) at any time to be& caught by the retaining means.

The concept of locking and unlocking the handle can be implemented by the locking mechanism irrespectively of whether the locking mechanism acts directly or indirectly on the lid part of the transport case to selectively lock the lid part to the base part and unlock the lid part from the base part. In the presently preferred embodiment, indirect locking and unlocking of the lid part is preferred, i.e. the locking mechanism preferably comprises: a closing mechanism arranged to selectively assume a first position holding the lid part to the base part and a second position not holding the lid part to the base part; and
a lock member, preferably operable by a key, said lock member arranged to selectively assume a first state locking the closing mechanism in the first position thereof, and a second state unlocking the closing mechanism from the first position thereof. In accordance with the invention, the lock member comprises a release state (releasing the handle from the retracted position) which may be identical to the second state or may be a third state of the lock member, in analogy of the preceding paragraphs.

Preferably, the handle is advantageously (spring-)biased to its projecting position so that when the locking mechanism or lock member is brought to the release state, the biasing force releases the handle automatically to the projecting position thereof. In other words, the handle is ejected by the biasing force. This effect facilitates both the handle usage and user access to any control element that may be covered by the handle in the retracted position thereof.

In a preferred embodiment, the locking mechanism or lock member, respectively, assumes its release state against a resilient element, e.g. against the force of a resilient element of the retaining means. In this manner, the locking mechanism or lock member returns to its previous state (e.g. the second state) as soon as the user stops urging the locking mechanism or lock member to its third state. In other words, as soon as the user stops urging the locking mechanism or lock member to its third state, the locking mechanism or lock member is ready again to catch and lock the handle in the retracted position thereof (once the user pushes the handle back).

In another preferred embodiment, the locking mechanism or lock member, respectively, is operable by a mechanical key arranged to be turned selectively from a first or locking angle to a second or unlocking angle and to a releasing angle achieving the first, second and release states of the locking mechanism or lock member, respectively. However, it is pointed out that the invention can be carried out using any alternative type of lock operating means, such as a mechanical combination lock comprising numbered thumb wheels, any mechanical special tool, or an electric or electronic key (e.g. a chip card) in combination with mechanical control elements.

Preferably, the lock receiving the key is arranged such that the key has to be rotated through a large angle, e.g. approximately 90 or 180, in order to switch the locking mechanism or lock member from the first or locking state to the second or unlocking state. In this manner, slight rotation of the key cannot change the locking state inadvertently. If the angle is chosen to be approximately 90, e.g. 85, the unlocking position of the key is transverse to the locking position of the key, which makes it particularly easy and reliable for the user to distinguish the positions of the key and, thus, to recognize the current state and function of the locking mechanism or lock member.

Conversely, it is convenient for the user to release the handle by turning the key in the lock through a small angle, e.g. 5, from the unlocking position or from the locking position. For safety reasons, it is preferred to release the handle by turning the key through a small angle beyond the unlocking position.

Preferably, the key can be removed from the locking mechanism or lock member only in the first or locking state thereof so that the user is reminded of locking his transport case before pulling out the key or equivalent lock operating means.

For enhanced security, the locking mechanism may comprise an additional retaining means arranged to retain the handle in the retracted position thereof when the locking mechanism is in its first state, the additional retaining means not retaining the handle in the retracted position when the locking mechanism is in its second or third state.

For user convenience, the locking mechanism—or a closing mechanism on which the locking mechanism acts—may preferably comprise an opening button which can be pushed to open the transport case if the locking mechanism is in its second and/or third states. Movement of the opening button is preferably blocked if the locking mechanism is in its first state so that the opening button cannot be pushed in that state.

In a particularly preferred arrangement of the aforementioned embodiment, the handle in its retracted position faces the opening button and can be pivoted onto the opening button to push the latter such as to open the transport case (unless the locking mechanism is in its first state), whereas the projecting position of the handle allows manual access to the opening button. This arrangement advantageously enables the user to push the opening button either directly (when the handle is in its projecting position) or indirectly by pressing the retracted handle onto the opening button which then opens the transport case (unless the locking mechanism is in its first state). On the other hand, direct access to the opening button is prevented when the handle is in its retracted and locked position.

In another preferred embodiment, the locking mechanism serves not only to lock the lid and handle of the transport case but also to lock the transport case to a fitting extension of a motorbike or carrier plate to which the transport case may be fitted (or attached). In such an arrangement, a wall portion (in particular a bottom portion) of the base part comprises an aperture for receiving a fitting extension of a motorbike or carrier plate;

the base part comprises a latch mechanism arranged to assume a first position coupling the base part to the received fitting extension and a second position uncoupling the base part from a received fitting extension; and the latch mechanism is locked in its first position when the locking mechanism is in a locked-latch state, and the latch mechanism is unlocked from its first position when the locking mechanism is in an unlocked-latch state.

Alternatively, the latch mechanism of the transport case may be arranged in the form of a mobile extension that protrudes from the base part of the transport to selectively engage a recess in the support structure of the motorbike.

Generally, either a horizontal wall or a vertical wall of the base part may be fitted to the motorbike. The wall of the base part fitted to the motorbike constitutes the "bottom portion" within the meaning of the preceding paragraph. Therefore, the term "bottom portion" is not limited to a lower horizontal wall of the base part. Further, the base part and lid part may be arranged either above or beside each other, with the base part being mounted to a support structure (e.g. the rack or an intermediate carrier plate) of the motorbike and the lid part being pivotable with respect to the base part.

The base part of the transport case may be provided with mechanical means for fitting and locking the base part detachably to a structure (e.g. rack) of the motorbike. If the base part is fitted detachably on a carrier plate arranged to be mounted on the (rack of) a motorbike, the transport case can be retrofitted more easily and efficiently to an existing motorbike.

Any type of releasable-coupling between the latch mechanism and the fitting extension may be used. Preferably, the latch mechanism is arranged to catch a conventional hook-shaped fitting extension which may protrude vertically from a support structure, in particular a carrier plate, of a motorbike. Alternatively, the latch mechanism may be arranged to catch a hole or a through hole provided in a cylindric or conic fitting pin, for example. Further equivalent means for catching a fitting extension by a latch mechanism will be apparent to those skilled in the art.

In an advantageous embodiment, the latch mechanism is biased by a resilient element, preferably by at least one spring, to the first or coupling position of the latch mechanism so that the coupled position is stable even when the latch mechanism is not locked;

the latch mechanism is positively held in its first or coupling position and cannot be urged against the force of the resilient element when the locking mechanism is in the locked-latch state; and the latch mechanism comprises a detachment button by which the latch mechanism can be urged manually against the force of the resilient element to assume the second or uncoupling position of the latch mechanism when the locking mechanism is in the unlocked-latch state.

In a particularly preferred embodiment, the locked-latch state of the locking mechanism is the first state thereof; and the unlocked-latch state of the locking mechanism is the second state thereof.

In such an arrangement, the first state of the locking mechanism provides three locking effects:

the closed transport case cannot be opened;

the fitted transport case cannot be detached from the fitting extension of the support structure (motorbike rack or carrier plate); and the retracted handle cannot be pulled out.

The second state of the locking mechanism provides the following effects:

The closed transport case can be opened, preferably by pushing the retracted handle onto an opening butting;

the fitted transport case can be detached from the fitting extension of the support structure (motorbike rack or carrier plate), preferably by pushing a detachment button; and the retracted handle cannot be pulled out.

The release state (e.g. third state) of the locking mechanism provides the following effects:

The retracted handle can be pulled out or may be ejected by the force of a spring;

the closed transport case can be opened, e.g. by manually pushing an opening butting that was covered by the retracted handle; and the fitted transport case can be detached from the fitting extension of the support structure (motorbike rack or carrier plate), preferably by pushing a detachment button.

Once the locking mechanism has returned from a third (release) state to its second state, the handle is caught and locked[]again when the handle is pivoted back to its retracted position.

In the most advanced and particularly advantageous embodiment, the locking mechanism thus fulfils three locking/unlocking functions in relation to the motorbike transport case.

An exemplary embodiment of the transport case according to the invention will be described in greater detail with reference to the drawings wherein FIG. 1 is a side elevational schematic view of a transport case fitted on a support structure of a motorbike;

FIG. 4 is a sectional view of a locking mechanism of the transport case, with the locking mechanism being in a first or locked state locking a closing mechanism, a latch mechanism and a retracted handle of the transport case;

Figure 1:
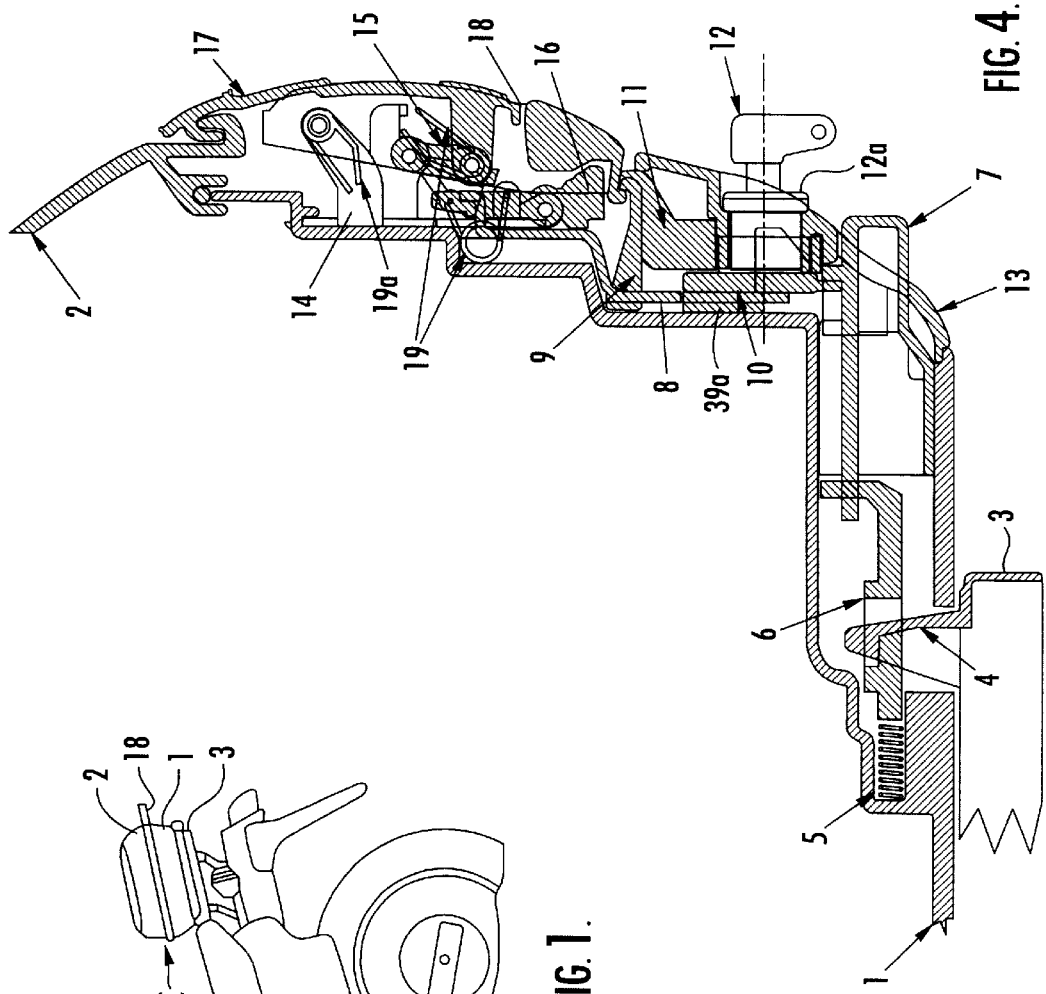

FIG. 1 schematically illustrates a transport case TC releasably fitted on a support structure 3 of a motorbike MB (the term motorbike including motorscooters). The transport case TC is preferably attached on the top surface of a support structure, as shown in FIG. 1. In that arrangement, the transport case TC may also be referred to as a top case. The transport case TC comprises a base part 1 which may be referred to as the bottom half-shell (assuming that the base part 1 is the lower part of a top mounted transport case), or just bottom shell. The transport case TC further comprises a lid part 2 which may be referred to as the top half-shell (assuming that the lid part 2 is the upper part of a top mounted transport case), or just top shell. Incidentally, the term "half-shell" as used herein does not imply that the lower and upper parts 1 and 2 of the transport case TC have to have the same size. The base part 1 and/or lid part 2 may be preferably made of polypropylene. While the base part 1 is shown to be fitted substantially horizontally to the support structure 3 of the motorbike, the subject application also contemplates alternative arrangements in which the base part 1 may be fitted in any other orientation (e.g. substantially vertically) to a motorbike. In any event, the lid part may be hinged to the base part such that the lid part is pivotable about a horizontal axis or a vertical axis. Likewise, the transport case is not restricted to being fitted to the rear structure of a motorbike. The invention also contemplates transport cases for use on lateral or front structures of a motorbike.

Figure 2:
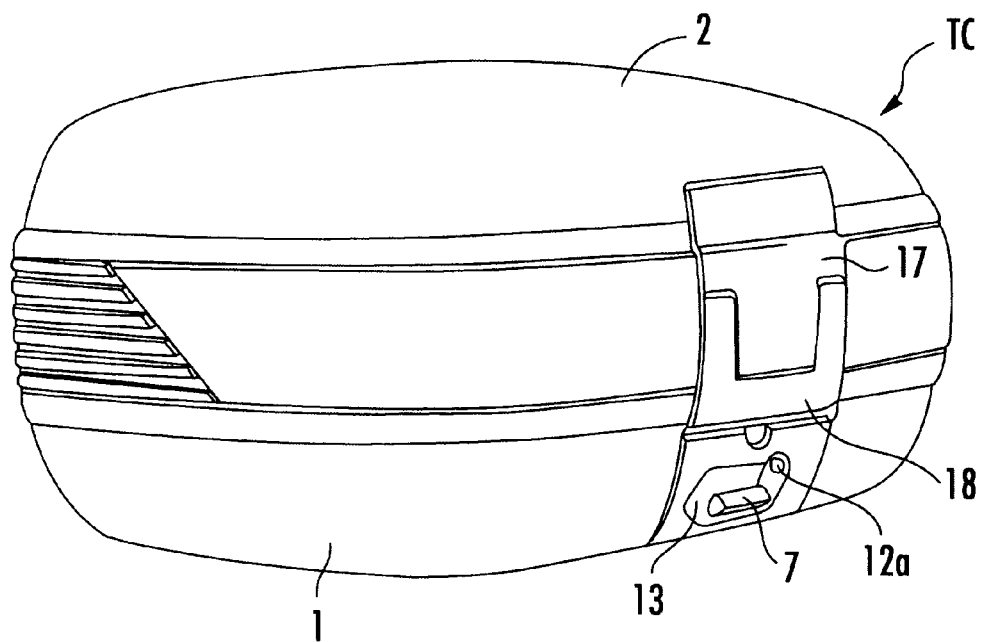
FIG. 2 is a perspective view of the transport case in its closed state.
Figure 3:
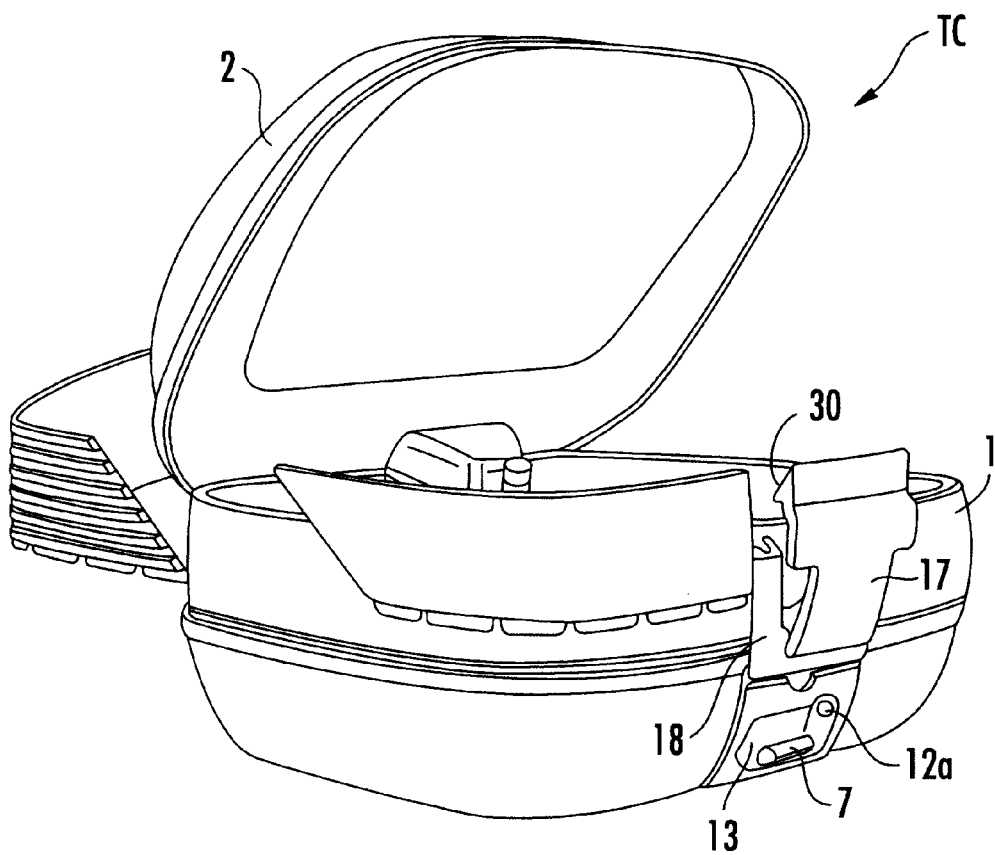
FIG. 3 is a (partly exploded) perspective view of the transport case in its open state.

With further reference to FIGS. 2 and 3, the lid part 2 may be hinged to the base part 1 such that the transport case (top case) TC can be opened by pivoting the lid part 2 upwardly from the base part 1 once a closing mechanism has been opened and a locking mechanism has been unlocked (as described in greater detail below). Conversely, the transport case TC can be closed by pivoting the lid part 2 downwardly onto the base part 1 where the lid part 2 can be held by the closing mechanism and locked by the locking mechanism.

According to the embodiment depicted in FIG. 1, the base part 1 (bottom shell) is fitted horizontally to the support structure 3 of the motorbike MB. The support structure 3 may be formed by a rack of the motorbike itself or by a standardized carrier plate additionally mounted (possibly retrofitted) to the motorbike. The support structure 3 and base part 1 are arranged to mate each other so that the base part 1 can be fitted and secured to the support structure 3 when the transport case TC is to be fitted, or attached, to the motorbike MB. To this end, the support structure 3 may comprise a conventional fitting extension 4 protruding from the surface of the support structure 3 (as shown in FIG. 4, for example) and adapted to be received in a base aperture 20 (FIG. 5A) of the bottom wall of the base part 1. A latch or bolt 6 is provided above the bottom aperture 20 in base part 1 to catch the fitting extension 4 which protrudes into the bottom aperture 20 once the transport case TC has been placed on the support structure 3. The locking mechanism of the transport case is able to lock the latch 6 in the position catching the fitting extension 4 so that the transport case cannot be detached from the support structure 3 by an unauthorized person.

In the following, an exemplary implementation of the closing and locking mechanisms of the transport case TC will be described in greater detail referring more specifically to the sectional view represented in FIG. 4. For clarity, the various components constituting the closing and locking mechanisms are also shown individually in FIGS. 5A, 5B and 5C. Typical operations for the closing and locking mechanisms will be explained with particular reference to FIGS. 4 and 6 to 9.

Figure 5A:
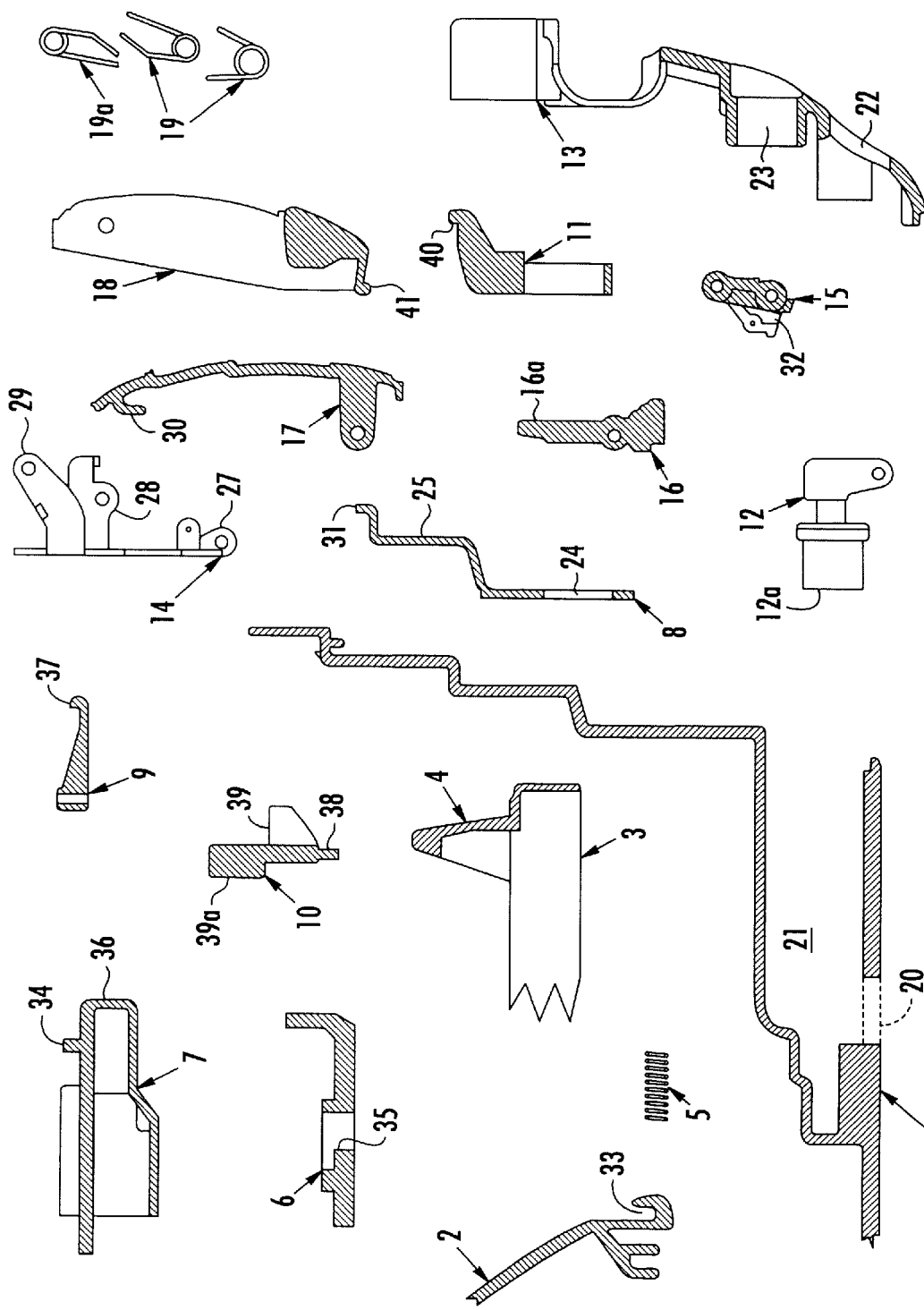
FIGS. 5A to 5C are detailed view of individual components of the locking mechanism.

FIG. 4 shows a portion of the base part 1 (bottom shell) and a portion of the pivotable lid part 2 (top shell) of the transport case TC. The lid part 2 can be held to the base part 1 by a closing mechanism comprising a rocker closing plate 17. The upper edge of the closing plate 17 is provided with a holding rim 30 (FIG. 5A) defining a hook-shaped or tooth-shaped cross-section of the closing plate 17. The holding rim 30 is adapted to face and engage a matching groove 33 (FIG. 5A) defining a hook-shaped or tooth-shaped cross-section of the closing plate 17. The holding rim 30 is adapted to face and engage a matching groove 33 (FIG. 5A)

provided along the free edge of the lid part 2. The closing plate 17—with the holding rim 30 engaging groove 33—can be rocked downwardly about an axis (defined by a pair of lugs 28 on a mounting plate 14, FIGS. 4 and 5C) through a pair of links 15 (FIGS. 4 and 5A) to snap into a stable position in which the closing plate 17 holds the lid part 2 tightly on the base part 1 (closed position, see FIGS. 2 and 4, for example).

Figure 5B:
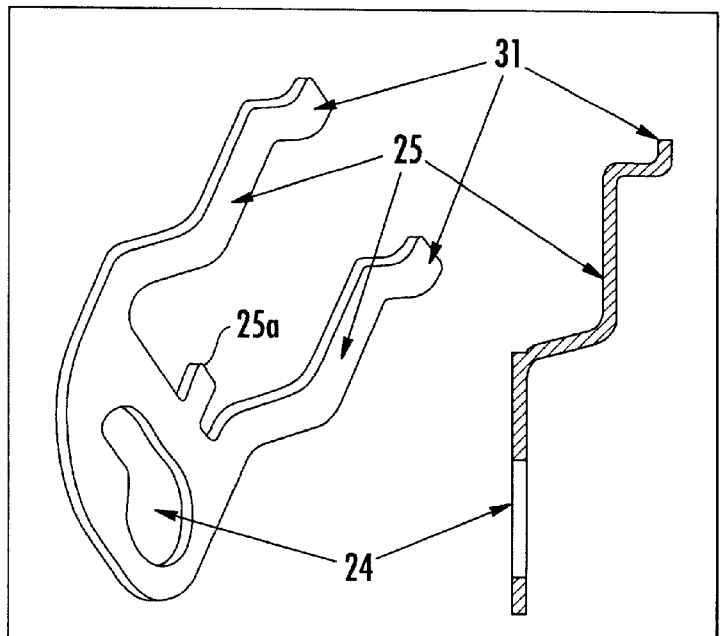
Figure 5C:
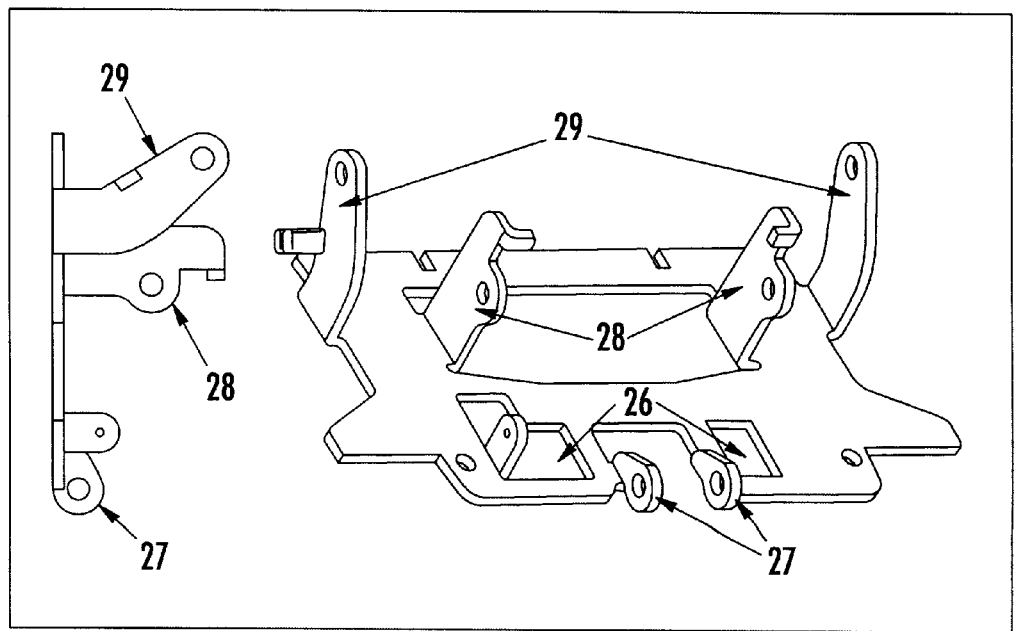

To open the transport case, the closing plate 17 is snapped out of the closed position by pushing an opening button 16 pivotably secured to another pair of lugs 27 of the mounting plate 14 (FIGS. 4 and 5C). Pushing the opening button 16 rotates an opening lever 16a which is connected to the opening button 16 (FIG. 5A) and may act on the links 15 to push the links 15 outwardly. Once the closing plate 17 has left its stable position, it can be rocked upwardly to undo the holding rim 30 from the lid groove 33.

Figure 9:
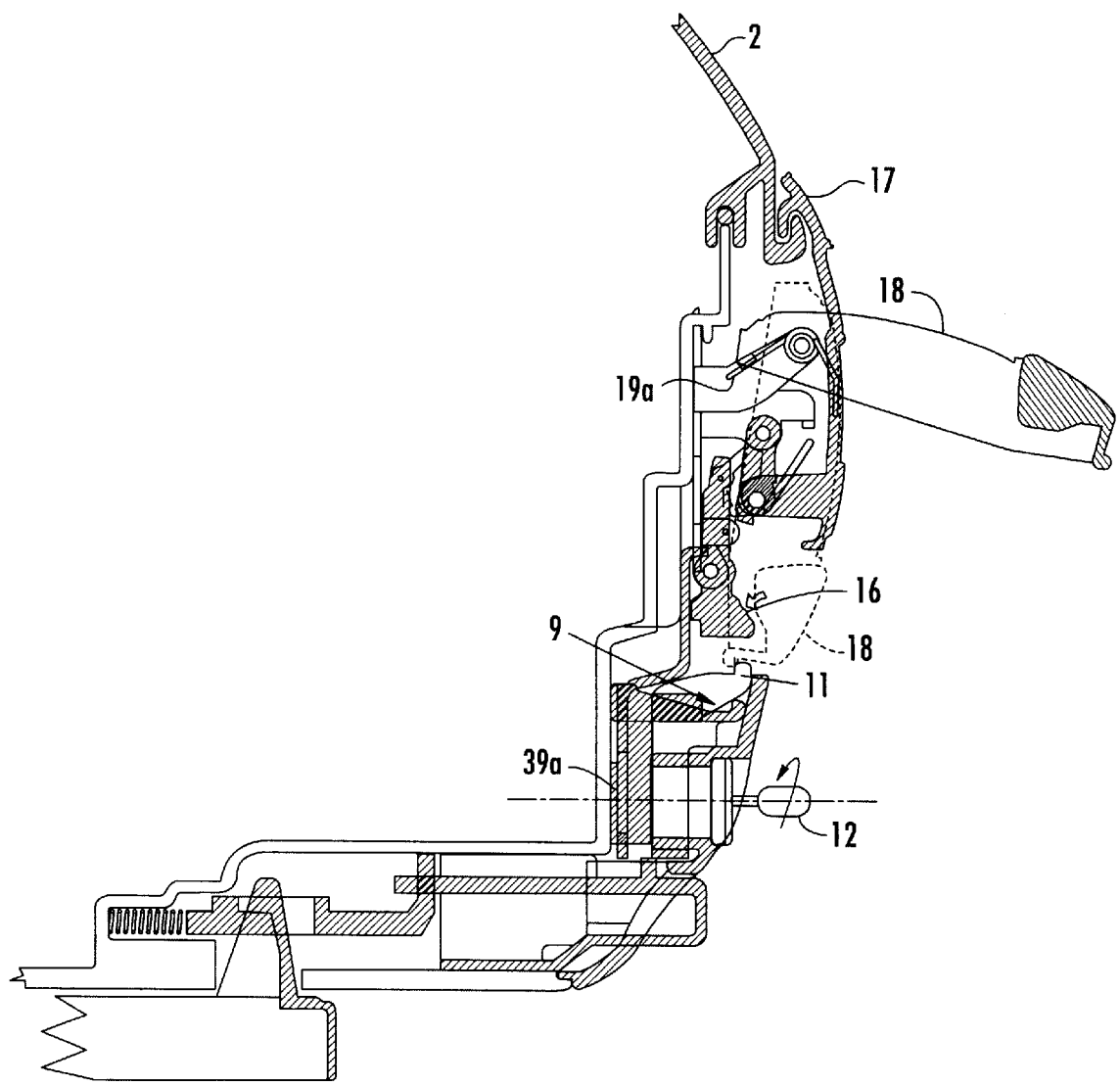
FIG. 9 is a sectional view of the locking mechanism in a third state releasing the handle from its retracted position and ejecting the handle to a projecting position thereof.

The mounting plate 14 is fixed to the base part 1 and comprises a further pair of lugs 29 (Figure 5C) to which a handle 18 is articulated such that the handle 18 can selectively pivot between a retracted position (see FIGS. 2, 3 and 4, for example) and a projecting position (see FIGS. 1 and 9). It is preferred that in the retracted position the handle 18 is substantially flush with the outer surface of the transport case TC (FIGS. 2 and 4). To this end, the outline of the closing plate 17 may be recessed (FIGS. 2 and 3) such as to accommodate the handle 18 when the handle 18 is retracted in the closed position of the transport case TC.

In the projecting position of the handle 18, the handle is preferably held by at least one projection spring 19a urging the handle 18 to its projecting position. Retaining means are provided to retain the handle 18 in its retracted position, the retaining means comprising a handle catch 11 which is mounted to the base part 1 and cooperates with a hooked edge 41 of the handle 18 (FIG. 5A). The locking mechanism (to be described below) is arranged to selectively release the handle catch 11. In the locked state of the handle catch 11, the handle 18 can be returned to the retracted position (because a hooked edge 40 of the handle catch 11 and the hooked handle edge 41 are complementary chamfered), but cannot be released from the retracted position to the projecting position (because the hooked edge 40 of the handle catch 11 retains the handle edge 41).

The handle 18 is preferably arranged to face the opening button 16 in the retracted position of the handle 18. Thus, by pivoting the handle 18 beyond its retracted idling position, the handle 18 can be pushed onto the opening button 16 to open the closing mechanism, i.e. to expel the links 15 with a view to rocking the closing plate 17 upwardly and undoing the holding rim 30 from the lid groove 33.

Referring to FIGS. 4 and 5A, the support structure 3 of a motorbike MB carries the base part 1 of the transport case TC. In this situation, the fitting extension 4 of the support structure 3 protrudes through the bottom aperture 20 of the base part 1. Generally, the shape of the fitting extension 4 enables the fitting extension 4 to be caught by a mating latch 6. In the embodiment shown, the fitting extension 4 comprises a hook-shaped end portion that can be caught by a blade 35 of the latch 6. A hole may be formed in the latch 6 so that the fitted extension 4 extends through both the bottom aperture 20 and the latch 6. Entry of the fitting extension 4 into the latch 6 may be facilitated by a chamfered lower surface of the blade 35. At least one latch spring 5 biases the latch 6 into a position where the blade 35 of the latch 6 engages the hook-shaped end of the fitting extension 4 to prevent the fitting extension 4 from leaving the bottom aperture 20.

A flat base chamber 21 may be formed inside the base part 1 above the bottom aperture 20 to accommodate the spring-biased latch 6 (including the latched fitting extension 4) and an elongated detachment button 7. A first end portion of the detachment button 7 is coupled to the latch 6, while a second end portion 36 of the detachment button 7 sticks out of the base part 1. More specifically, the second end 36 of the detachment button 7 may protrude through a slot 22 of a cover plate 13. The detachment button 7 is displaceable along its longitudinal axis within the base chamber 21 unless the detachment button 7 is locked by the locking mechanism of the transport case TC. The locking mechanism may engage the detachment button 7 by any suitable engaging means; in the embodiment show, the upper surface of the detachment button 7 is provided with a locking rib 34 (FIG. 5A). The locking mechanism can engage the locking rib 34 such as to prevent the detachment button 7 from being pushed into the base chamber 21. Pushing the detachment button 7 into the base chamber 21 (against the force of the latch spring or springs 5) results in the fitting extension 4 being detached from the blade 35 of the latch 6.

Still referring to FIG. 4, the components of the actual locking mechanism will be described next. A lock 12a operable by a key 12 is fixed to the base part 1 such as to extend horizontally through a bore 23 of the cover plate 13. The key 12 can be inserted and rotated in the lock 12a in order to rotate a lock plate 10 fixed to the lock 12a at the lock end opposite to the key insertion side. When the key 12 is rotated in the lock 12a, the lock 12a may provide tactile feedback to the user about the angular position reached. For example, a spring-biased ball (not shown) may enter into spherical recesses provided at predetermined angular positions on the surface of the lock plate 10. The lock 12a may be arranged such that the key 12 can be removed only in one of its possible angular positions, preferably in the locking position so that maximum security is provided to the user when he/she leaves the transport case TC on the motorbike MB and removes the key 12.

The lock plate 10 comprises a lock finger 38, an eccentric lock cam 39a and a lock tab 39. The lock finger 38 is arranged to engage the locking rib 34 of the detachment button 7 in a first state of the lock 12a (locking state). The lock cam 39a is arranged to act on a cam follower 24 (best seen in FIG. 5B) in order to establish a second state of the lock 12a (unlocking state). The lock tab 39 is arranged to act on the handle catch 11 in order to release the handle catch 11 in a release state of the lock 12a (preferably a third state thereof).

The cam follower 24 is provided in the form of a hole which has been punched in a locking pawl 8 (as shown in FIG. 5B). After assembly of the locking mechanism (see e.g. FIG. 4), the punched hole 24 receives the lock cam 39a. When the key 12 is turned in the lock 12a, the eccentric lock cam 39a rotates within the punched hole of the pawl 8, and the contour of the punched hole is forced to follow the movement of the cam 39a. As a result, the entire locking pawl 8 is displaced downwardly to bring the lock 12a from its locking (first) state to its unlocking (second) state, or upwardly to bring the lock 12a from its unlocking (second) state to its locking (first) state. In addition to the area comprising the punched hole 24, the locking pawl 8 comprises a pair of arms 25 the ends of which are denoted 31.

In the second state or preferably in a third state of the lock 12a, the lock tab 39 releases the hooked edge 40 of the handle catch 11 from the hooked edge 41 of the handle 18 so that the handle 18 can be swung out of its retracted position (e.g. FIG. 4) to its projecting position (FIG. 9). This pivoting movement of the handle 18 may be supported by a projection spring 19a such that the handle 18 is ejected automatically once the lock tab 39 makes the handle catch 11 release the edge 41 of the handle 18.

A stub 25a may be provided on the locking pawl 8 (FIG. 5B) to carry a second handle catch 9 comprising a hookedledge 37 (FIGS. 4 and 5A). Hence, the second handle catch 9 is displaced downwardly and upwardly with the locking pawl 8. In other words, when the lock 12a is in its locking (first) state, the hooked edge 37 of the second handle catch 9 engages the hooked handle edge 41 to prevent the handle 18 from being pivoted out of its retracted position. When the lock 12a is in its unlocking (second) state, the locking pawl 8 and the second handle catch 9 have been displaced downwardly and, thus, the hooked edge 37 of the second handle catch 9 no longer engages the hooked handle edge 41.

In the following, typical locking, unlocking and releasing operations will be explained with particular reference to FIGS. 4 and 6 to 9.

In the situation shown in FIG. 4, the key 12 has been inserted in the lock 12a in the first, or locking, position of the locking mechanism (this angular position of the key 12 may be defined as 0°). The lock finger 38 engages the locking rib 34 of the detachment button 7 so that the detachment button 7 cannot be pushed into the base chamber 21 to remove the latch 6 from the fitting extension 4. In other words, the base part 1 cannot be detached from the support structure 3.

At the same time, the lock cam 39a is in its upper position holding the locking pawl 8 in an upper position. Therefore, the ends 31 of the pawl arms 25 each engage a gap 32 formed in each link 15. To this end, the pawl arms 25 may pass through holes 26 of the mounting plate 14. As the ends 31 of the pawl arms 25 hold the links 15, the links 15 cannot be moved outwardly when the opening button 16 is pushed (directly or indirectly, i.e. by pushing a user's finger or the handle 18 onto the opening button 16). Hence, the closing plate 17 cannot be rocked upwardly to open the transport case TC.

Further, the first handle catch 11 and the second handle catch 9 each engage the hooked edge 41 of the handle 18 so that the handle 18 is held in its retracted position and cannot be pivoted to its projecting position.

Figure 6:
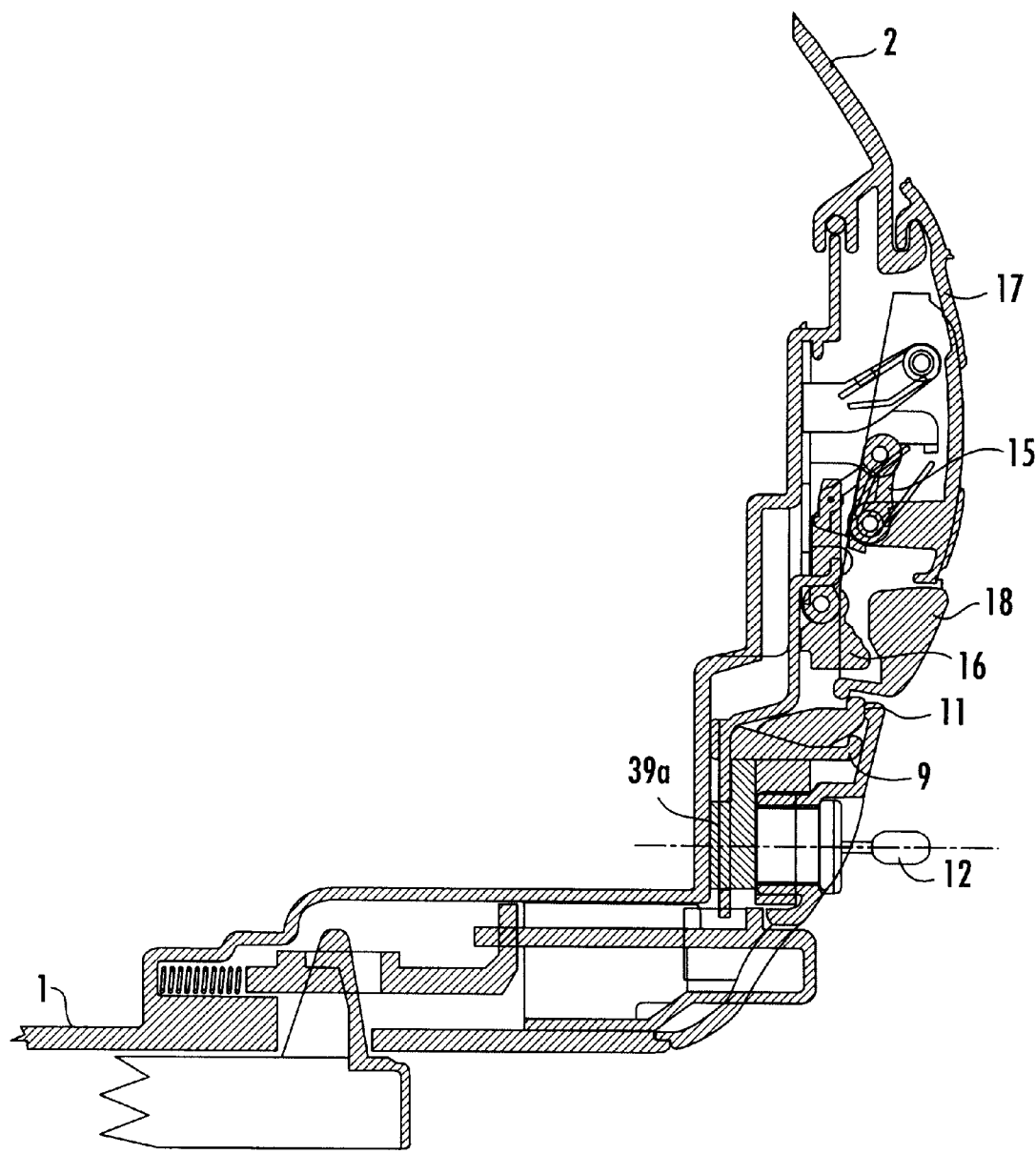
FIG. 6 is a sectional view of the locking mechanism in a second or unlocked state.

In the situation shown in FIG. 6, the key 12 has been rotated by e.g. 85° to reach the second, or unlocking, state of the locking mechanism. In this state, the lock finger 38 does not engage the locking rib 34 of the detachment button 7 so that the detachment button 7 can be pushed into the base chamber 21 to remove the latch 6 from the fitting extension 4. In other words, the base part 1 can be detached from the support structure 3.

At the same time, the lock cam 39a is in its lower position holding the locking pawl 8 in a lower position. Therefore, the ends 31 of the pawl arms 25 have left the gaps 32 of the links 15. As the ends 31 of the pawl arms 25 no longer hold the links 15, the links 15 can be moved outwardly when the opening button 16 is pushed. In the situation shown in FIG. 7, the opening button 16 is pushed by pushing the handle 18 onto the opening button 16. Hence, the closing plate 17 can be rocked upwardly to open the transport case TC, as shown in FIG. 8.

Figure 7:
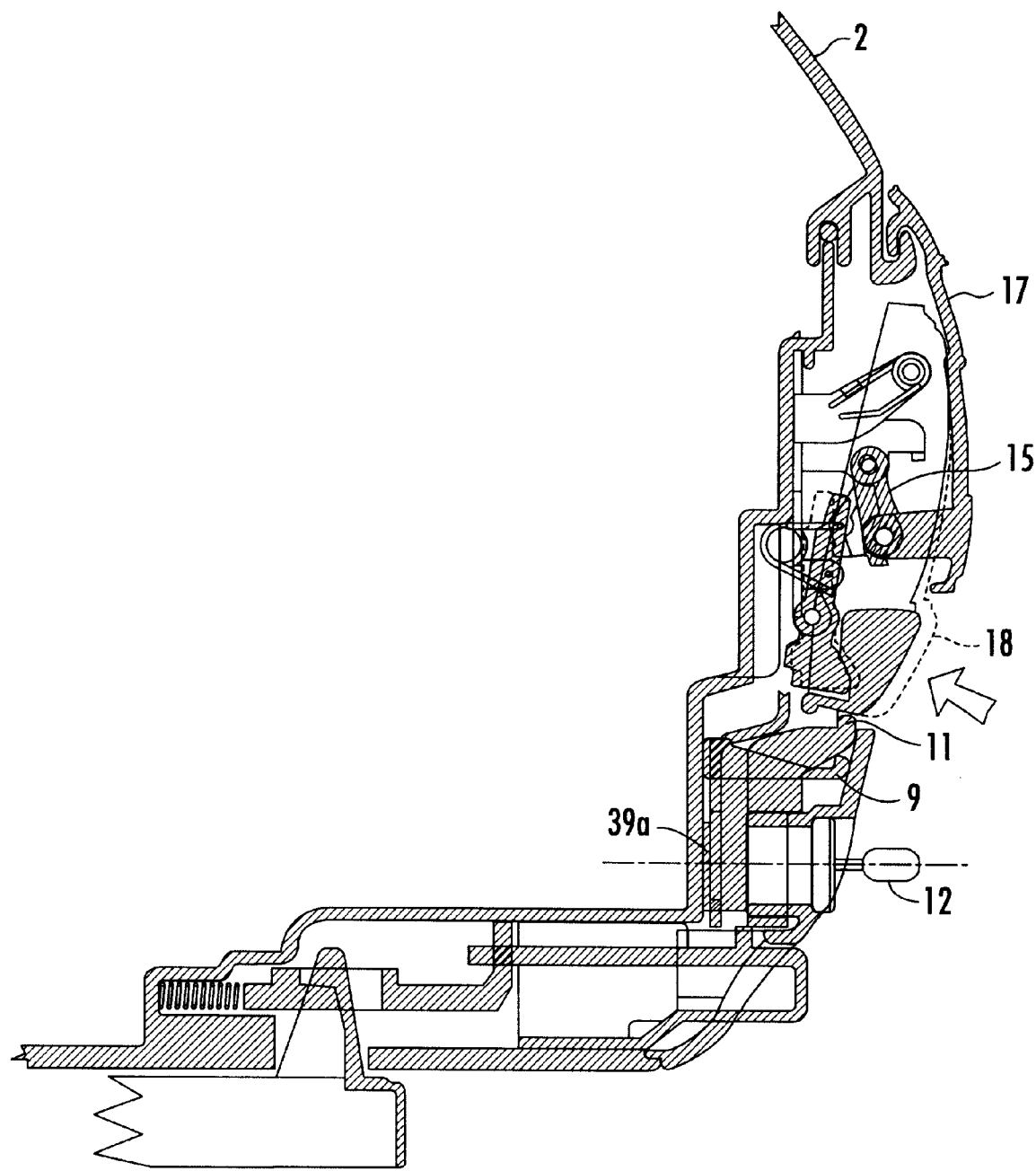
FIG. 7 is a sectional view of the locking mechanism in the second or unlocked state, with the handle being pushed onto an opening button to open the closing mechanism of the transport case.
Figure 8:
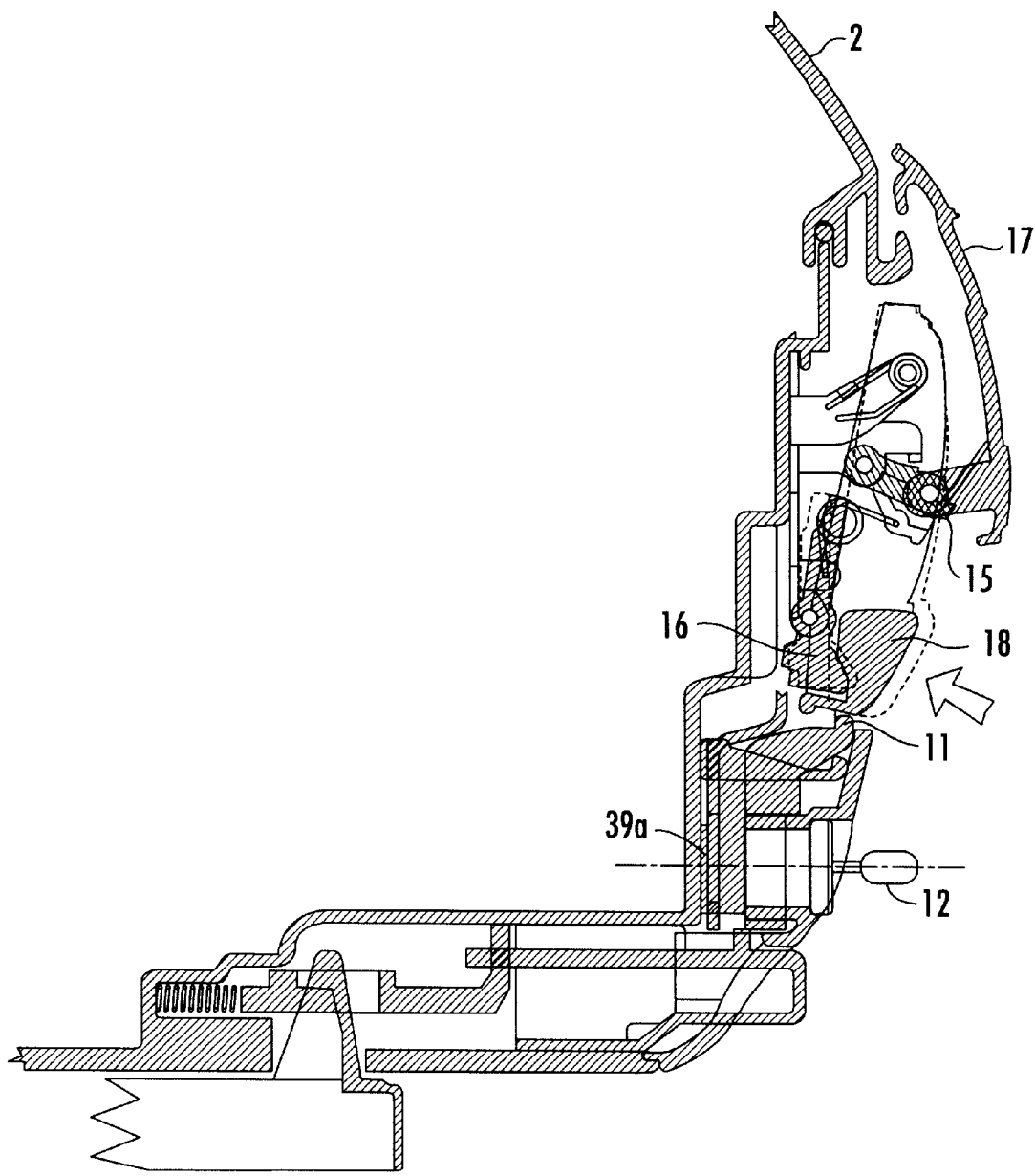
FIG. 8 is a sectional view of the locking mechanism in the second or unlocked state, once the handle has been pushed onto the opening button to open the closing mechanism of the transport case.

In the unlocked (second) state illustrated in FIGS. 6, 7 and 8, only the first handle catch 11 engages the hooked edge 41 of the handle 18 so that the handle 128 is held in its retracted position and cannot be pivoted to its projecting position. The second handle catch 9 has been lowered with the locking pawl 8 and, thus, no longer engages the hooked handle edge 41.

In any of the unlocked states illustrated in FIGS. 6, 7 and 8 (i.e. irrespectively of whether the closing plate 17 is in its closed or open position), the handle 18 can be released from its retracted position to its projecting position (as shown in FIG. 9) by turning the key 12 from the second key position (e.g. 85°) to a third key position (e.g. 90°) to disengage the hooked edge 40 of the handle catch 11 from the hooked edge 41 of the handle 18 so that the handle 18 can be pivoted out manually or ejected automatically (by spring 19a) to its projecting position. The handle catch 11 may be fixed to the base part 1 in a resilient manner so that the key 12 returns automatically to the second key position (85°) once the user releases the key 12 in the third key position.

In any state of the closing and locking mechanism (except for the third key position), the projecting handle 18 can be pivoted back to be caught in the retracted position thereof. When the handle 18 is in its projecting position, the opening button 16 is directly accessible to be pushed by a user's finger to open the closing plate 17. When the handle 18 is in its retracted position, the handle 18 can be pushed onto the opening button 16 to open the closing plate 17 if the lock 12a is in its second (unlocked) state.

The above description of a presently preferred embodiment shows that a number of innovative and advantageous functions can be realized in the closing and locking mechanisms of a motorbike transport case using the principles disclosed by the subject application and defined in the appended claims.

What is claimed is:

1. A transport case (TC) comprising:
   a base part arranged to be detachably fitted to a motorbike (MB);
   a lid part hinged to said base:part such that said lid part can be pivoted away from said base part to open said transport case (TC) and pivoted toward said base part to close said transport case, (TC);
   a locking mechanism, said locking mechanism being selectively movable between a first state locking said lid part to the base part and a second state unlocking the lid part from the base part; and
   a handle articulated to said base part of said transport case (TC), in such a manner that said handle can be pivoted between a retracted position and a projecting position;
   characterized in that
      said locking mechanism comprises retaining means for retaining said handle in the retracted position thereof;
      said handle is biased to its projecting position; and
      said locking mechanism is operable to selectively assume a release state in which said retaining means automatically releases said handle from the retracted position to the projecting position thereof.

2. The transport case (TC) according to claim 1, characterized in that the release state of said locking mechanism (12a, 8, 31, 32, 39, 39a) is a third state thereof, and said retaining means (11, 41) are arranged to retain said handle (18) in the retracted position thereof when said locking mechanism is in its first and second states.

3. The transport case (TC) according to claim 1, characterized in that said locking mechanism (12a, 8, 31, 32, 39, 39a) comprises:
   a closing mechanism (14, 15, 17, 30, 33) arranged to selectively assume a first position holding said lid part (2) to said base part (1) and a second position not holding said lid part (2) to said base part (1); and
   a lock member (12a, 8, 31,32), said lock member being selectively movable between a first state locking said closing mechanism (15, 17) in the first position thereof, a second state unlocking said closing mechanism (15, 17) from the first position thereof, and a release state releasing said handle (18) from the retracted position.

4. The transport case (TC) according to claim 1 characterized in that said locking mechanism is operable to assume its release state against a resilient element.

5. The transport case (TC) according to claim 1 characterized in that the locking mechanism or lock member, respectively, is operable by a key (12) arranged to be turned selectively from a first locking angle to a second unlocking angle and to a releasing angle achieving the first, second and release states of the locking mechanism or lock member, respectively.

6. The transport case (TC) according to claim 5, characterized in that the releasing angle is displaced from the second angle by substantially 5°.

7. The transport case (TC) according to claim 5, characterized in that the second angle is displaced from the first angle by substantially 85°.

8. The transport case (TC) according to claim 5, characterized in that the key (12) can be removed from said locking mechanism (12a) only in the first state of thereof.

9. The transport case (TC) according to claim 1 characterized in that
    said locking mechanism comprises an additional retaining means (9) arranged to retain said handle (18) in the retracted position thereof when said locking mechanism (12a, 10, 39a, 8) is in its first state; and
    said additional retaining means (9) does not retain said handle (18) in the retracted position thereof when said locking mechanism is in its second state.

10. The transport case (TC) according to claim 1 characterized in that said locking mechanism comprises an opening button (16) which when pushed opens the transport case (TC) unless said locking mechanism (12a, 10, 39a, 8, 31, 32) is in its first state.

11. The transport case (TC) according to claim 10, characterized in that
    said handle (18) in its retracted position faces said opening button (16) and can be pivoted onto said opening button (16) to push said opening button such as to open the transport case (TC) unless said locking mechanism (12a, 10, 39a, 8, 31, 32) is in its first state; and
    said handle (18) in its projecting position allows manual access to said opening button (16).

12. The transport case (TC) according to claim 1 characterized in that
    a wall portion of said base part (1) comprises an aperture (20) for receiving a fitting extension (4) of a support structure (3) of a motorbike (MB);
    said base part (1) comprises a latch mechanism (5, 6, 7) arranged to assume a first position coupling said base part (1) to a received fitting extension (4) and a second position uncoupling said the base part (1) from a received fitting extension (4); and
    said latch mechanism (5, 6, 7) is locked in its first position when said locking mechanism (12a, 10, 38, 34) is in a locked-latch state, and said latch mechanism (5, 6, 7) is unlocked from its first position when said locking mechanism (12a, 10, 38, 34) is in an unlocked-latch state.

13. The transport case (TC) according to claim 12, characterized in that
    said latch mechanism (6, 7) is biased by a resilient element to the first position of said latch mechanism (6, 7);
    said latch mechanism (6, 7) is positively held in its first position and cannot be urged against the force of said the resilient element (5) when said locking mechanism (12a, 10, 38, 34) is in the locked-latch state; and
    said latch mechanism (6, 7) comprises a detachment button (7) by which said latch mechanism (6, 7) can be urged manually against the force of said resilient element (5) to assume the second position of said latch mechanism (6, 7) when said locking mechanism (12a, 10, 38, 34) is in the unlocked-latch state.

14. The transport case according to claim 1 wherein said locking mechanism comprises a key-operated locking system.

15. The transport case according to claim 1 wherein said base part is arranged to be detachably fitted to a carrier plate mounted on a motorbike.

16. The transport case according to claim 13 wherein said resilient element comprises at least one spring.

17. A transport case (TC) comprising:
    a base part arranged to be detachably fitted to a motorbike (MB);
    a lid part hinged to said base part such that said lid part can be pivoted away from said base part to open said transport case (TC) and pivoted toward said base part to close said transport case (TC);
    a locking mechanism, said locking mechanism being selectively movable between a first state locking said lid part to the base part and a second state unlocking the lid part from the base part; and
    a handle articulated to said base part of said transport case (TC), in such a manner that said handle can be pivoted between a retracted position and a projecting position; characterized in that
        said locking mechanism comprises retaining means for retaining said handle in the retracted position thereof;
        said locking mechanism is arranged to selectively assume a release state in which said retaining means releases said handle from the retracted position thereof;
        said locking mechanism is operable by a key arranged to be turned selectively from a first locking angle to a second unlocking angle and to a releasing angle achieving the first, second and release states of the locking mechanism; and
        the releasing angle is displaced from the second angle by substantially 5°.

18. The transport case (TC) according to claim 17, characterized in that the release state of said locking mechanism is a third state thereof, and said retaining means are arranged to retain said handle in the retracted position thereof when said locking mechanism is in its first and second states.

19. The transport case (TC) according to claim 17, characterized in that said locking mechanism comprises:
    a closing mechanism arranged to selectively assume a first position holding said lid part to said base part and a second position not holding said lid part to said base part; and
    a lock member, said lock member being selectively movable between a first state locking said closing mechanism in the first position thereof, a second state unlocking said closing mechanism from the first position thereof, and a release state releasing said handle from the retracted position.

20. The transport case (TC) according to claim 17, characterized in that said handle is biased to its projecting position; and said locking mechanism is operable to assume the release state such as to release said handle automatically to the projecting position thereof.

21. The transport case (TC) according to claim 17, characterized in that said locking mechanism is operable to assume its release state against a resilient element.

22. The transport case (TC) according to claim 17, characterized in that the second angle is displaced from the first angle by substantially 85°.

23. The transport case (TC) according to claim 17, characterized in that the key can be removed from said locking mechanism only in the first state of thereof.

24. The transport case (TC) according to claim 17, characterized in that said locking mechanism further comprises an additional retaining means arranged to retain said handle in the retracted position thereof when said locking mechanism is in its first state; and said additional retaining means does not retain said handle in the retracted position thereof when said locking mechanism is in its second state.

25. The transport case (TC) according to claim 17, characterized in that said locking mechanism further comprises an opening button which when pushed opens the transport case (TC) unless said locking mechanism is in its first state.

26. The transport case (TC) according to claim 25, characterized in that said handle in its retracted position faces said opening button and can be pivoted onto said opening button to push said opening button such as to open the transport case (TC) unless said locking mechanism is in its first state; and said handle in the projecting position thereof allows manual access to said opening button.

27. The transport case (TC) according to claim 17 characterized in that a wall portion of said base part comprises an aperture for receiving a fitting extension of a support structure of a motorbike (MB);

said base part comprises a latch mechanism arranged to assume a first position coupling said base part to a received fitting extension and a second position uncoupling said base part from a received fitting extension; and said latch mechanism is locked in its first position when said locking mechanism is in a locked-latch state, and said latch mechanism is unlocked from its first position when said locking mechanism is in an unlocked-latch state.

28. The transport case (TC) according to claim 27, characterized in that said latch mechanism is biased by a resilient element to the first position of said latch mechanism;

said latch mechanism is positively held in its first position and cannot be urged against the force of said resilient element when said locking mechanism is in the locked-latch state; and said latch mechanism comprises a detachment button by which said latch mechanism can be urged manually against the force of said resilient element to assume the second position of said latch mechanism when said locking mechanism is in the unlocked-latch state.

29. The transport case according to claim 28 wherein said resilient element comprises at least one spring.

30. The transport case according to claim 17 wherein said base part is arranged to be detachably fitted to a carrier plate mounted on a motorbike.

31. A transport case (TC) comprising:

a base part arranged to be detachably fitted to a motorbike (MB);

a lid part hinged to said base part such that said lid part can be pivoted away from said base part to open said transport case (TC) and pivoted toward said base part to close said transport case (TC);

a locking mechanism, said locking mechanism being selectively movable between a first state locking said lid part to the base part and a second state unlocking the lid part from the base part; and a handle articulated to said base part of said transport case (TC), in such a manner that said handle can be pivoted between a retracted position and a projecting position; characterized in that said locking mechanism comprises retaining means for retaining said handle in the retracted position thereof;

said locking mechanism is arranged to selectively assume a release state in which said retaining means releases said handle from the retracted position thereof;

said locking mechanism is operable by a key arranged to be turned selectively from a first locking angle to a second unlocking angle and to a releasing angle achieving the first, second and release states of the locking mechanism; and the second angle is displaced from the first angle by substantially 85°.

32. The transport case (TC) according to claim 31, characterized in that the release state of said locking mechanism is a third state thereof, and said retaining means are arranged to retain said handle in the retracted position thereof when said locking mechanism is in its first and second states.

33. The transport case (TC) according to claim 31, characterized in that said locking mechanism further comprises:

a closing mechanism arranged to selectively assume a first position holding said lid part to said base part and a second position not holding said lid part to said base part; and a lock member, said lock member being selectively movable between a first state locking said closing mechanism in the first position thereof, a second state unlocking said closing mechanism from the first position thereof, and a release state releasing said handle from the retracted position.

34. The transport case (TC) according to claim 31 characterized in that said handle is biased to its projecting position; and said locking mechanism is operable to assume the release state such as to release said handle automatically to the projecting position thereof.

35. The transport case (TC) according to claim 31, characterized in that said locking mechanism is operable to assume its release state against a resilient element.

36. The transport case (TC) according to claim 31, characterized in that the releasing angle is displaced from the second angle by substantially 5°.

37. The transport case (TC) according to claim 31, characterized in that the key can be removed from said locking mechanism only in the first state of thereof.

38. The transport case (TC) according to claim 31, characterized in that
said locking mechanism further comprises an additional retaining means arranged to retain said handle in the retracted position thereof when said locking mechanism is in its first state; and
said additional retaining means does not retain said handle in the retracted position thereof when said locking mechanism is in its second state.

39. The transport case (TC) according to claim 31, characterized in that said locking mechanism further comprises an opening button which when pushed opens the transport case (TC) unless said locking mechanism is in its first state.

40. The transport case (TC) according to claim 39, characterized in that
said handle in its retracted position faces said opening button and can be pivoted onto said opening button to push said opening button such as to open the transport case (TC),unless said locking mechanism is in its first state; and
said handle in the projecting position thereof allows manual access to said opening button.

41. The transport case (TC) according to claim 31 characterized in that
a wall portion of said base part comprises an aperture for receiving a fitting extension of a support structure of a motorbike (MB);
said base part comprises a latch mechanism arranged to assume a first position coupling said base part to a received fitting extension and a second position uncoupling said base part from a received fitting extension; and
said latch mechanism is locked in its first position when said locking mechanism is in a locked-latch state, and said latch mechanism is unlocked from its first position when said locking mechanism is in an unlocked-latch state.

42. The transport case (TC) according to claim 41, characterized in that
said latch mechanism is biased by a resilient element to the first position of said latch mechanism;
said latch mechanism is positively held in its first position and cannot be urged against the force of said resilient element when said locking mechanism is in the locked-latch state; and
said latch mechanism comprises a detachment button by which said latch mechanism can be urged manually against the force of said resilient element to assume the second position of said latch mechanism when said locking mechanism is in the unlocked-latch state.

43. The transport case according to claim 42 wherein said resilient element comprises at least one spring.

44. The transport case according to claim 31 wherein said base part is arranged to be detachably fitted to a carrier plate mounted on a motorbike.

45. A transport case (TC) comprising:
a base part arranged to be detachably fitted to a motorbike (MB);
a lid part hinged to said base part such that said lid part can be pivoted away from said base part to open said transport case (TC) and pivoted toward said base part to close said transport case (TC);
a locking mechanism, said locking mechanism being selectively movable between a first state locking said lid part to the base part and a second state unlocking the lid part from the base part; and
a handle articulated to said base part of said transport case (TC), in such a manner that said handle can be pivoted between a retracted position and a projecting position; characterized in that
said locking mechanism comprises retaining means for retaining said handle in the retracted position thereof;
said locking mechanism is arranged to selectively assume a release state in which said retaining means releases said handle from the retracted position thereof;
said locking mechanism further comprises an opening button which when pushed opens the transport case (TC) unless said locking mechanism is in its first state;
said handle in its retracted position faces said opening button and can be pivoted onto said opening button to push said opening button such as to open the transport case (TC) unless said locking mechanism is in its first state; and
said handle in its projecting position allows manual access to said opening button.

46. The transport case (TC) according to claim 45, characterized in that the release state of said locking mechanism is a third state thereof, and said retaining means are arranged to retain said handle in the retracted position thereof when said locking mechanism is in its first and second states.

47. The transport case (TC) according to claim 45, characterized in that said locking mechanism comprises:
a closing mechanism arranged to selectively assume a first position holding said lid part to said base part and a second position not holding said lid part to said base part; and
a lock member, said lock member being selectively movable between a first state locking said closing mechanism in the first position thereof, a second state unlocking said closing mechanism from the first position thereof, and a release state releasing said handle from the retracted position.

48. The transport case (TC) according to claim 45, characterized in that
said handle is biased to its projecting position; and
said locking mechanism is operable to assume the release state such as to release said handle automatically to the projecting position thereof.

49. The transport case (TC) according to claim 45, characterized in that said locking mechanism is operable to assume its release state against a resilient element.

50. The transport case (TC) according to claim 45, characterized in that the locking mechanism is operable by a key arranged to be turned selectively from a first locking angle to a second unlocking angle and to a releasing angle achieving the first, second and release states of the locking mechanism.

51. The transport case (TC) according to claim 50, characterized in that the releasing angle is displaced from the second angle by substantially 5°.

52. The transport case (TC) according to claim 50, characterized in that the second angle is displaced from the first angle by substantially 85°.

53. The transport case (TC) according to claim 50, characterized in that the key can be removed from said locking mechanism only in the first state of thereof.

54. The transport case (TC) according to claim 45, characterized in that
said locking mechanism further comprises an additional retaining means arranged to retain said handle in the retracted position thereof when said locking mechanism is in its first state; and said additional retaining means does not retain said handle in the retracted position thereof when said locking mechanism is in its second state.

55. The transport case (TC) according to claim 45 characterized in that a wall portion of said base part comprises an aperture for receiving a fitting extension of a support structure of a motorbike (MB);

said base part comprises a latch mechanism arranged to assume a first position coupling said base part to a received fitting extension and a second position uncoupling said the base part from a received fitting extension; and said latch mechanism is locked in its first position when said locking mechanism is in a locked-latch state, and said latch mechanism is unlocked from its first position when said locking mechanism is in an unlocked-latch state.

56. The transport case (TC) according to claim 55, characterized in that said latch mechanism is biased by a resilient element to the first position of said latch mechanism;

said latch mechanism is positively held in its first position and cannot be urged against the force of said resilient element when said locking mechanism is in the locked-latch state; and said latch mechanism comprises a detachment button by which said latch mechanism can be urged manually against the force of said resilient element to assume the second position of said latch mechanism when said locking mechanism is in the unlocked-latch state.

57. The transport case according to claim 56 wherein said resilient element comprises at least one spring.

58. The transport case according to claim 45 wherein said locking mechanism comprises a key-operated locking system.

59. The transport case according to claim 45 wherein said base part is arranged to be detachably fitted to a carrier plate mounted on a motorbike.

60. A transport case (TC) comprising:

a base part arranged to be detachably fitted to a motorbike (MB);

a lid part hinged to said base part such that said lid part can be pivoted away from said base part to open said transport case (TC) and pivoted toward said base part to close said transport case (TC);

a locking mechanism, said locking mechanism being selectively movable between a first state locking said lid part to the base part and a second state unlocking the lid part from the base part; and a handle articulated to said base part of said transport case (TC), in such a manner that said handle can be pivoted between a retracted position and a projecting position; characterized in that a wall portion of said base part comprises an aperture for receiving a fitting extension of a support structure of a motorbike (MB);

said base part comprises a latch mechanism arranged to assume a first position coupling said base part to a received fitting extension and a second position uncoupling said the base part from a received fitting extension;

said latch mechanism is locked in its first position when said locking mechanism is in a locked-latch state, and said latch mechanism is unlocked from its first position when said locking mechanism is in an unlocked-latch state, said latch mechanism is biased by a resilient element to the first position of said latch mechanism, said resilient element comprises at least one spring;

said latch mechanism is positively held in its first position and cannot be urged against the force of said resilient element when said locking mechanism is in the locked-latch state;

said latch mechanism comprises a detachment button by which said latch mechanism can be urged manually against the force of said resilient element to assume the second position of said latch mechanism when said locking mechanism is in the unlocked-latch state;

said locking mechanism comprises retaining means for retaining said handle in the retracted position thereof, and said locking mechanism is arranged to selectively assume a release state in which said retaining means releases said handle from the retracted position thereof.

61. The transport case (TC) according to claim 60, characterized in that the release state of said locking mechanism is a third state thereof, and said retaining means are arranged to retain said handle in the retracted position thereof when said locking mechanism is in its first and second states.

62. The transport case (TC) according to claim 60, characterized in that said locking mechanism further comprises:

a closing mechanism arranged to selectively assume a first position holding said lid part to said base part and a second position not holding said lid part to said base part; and a lock member, said lock member being selectively movable between a first state locking said closing mechanism in the first position thereof, a second state unlocking said closing mechanism from the first position thereof, and a release state releasing said handle from the retracted position.

63. The transport case (TC) according to claim 60 characterized in that said handle is biased to its projecting position; and said locking mechanism is operable to assume the release state such as to release said handle automatically to the projecting position thereof.

64. The transport case (TC) according to claim 60, characterized in that said locking mechanism is operable to assume its release state against a resilient element.

65. The transport case (TC) according to claim 60, characterized in that the locking mechanism is operable by a key arranged to be turned selectively from a first locking angle to a second unlocking angle and to a releasing angle achieving the first, second and release states of the locking mechanism.

66. The transport case (TC) according to claim 65, characterized in that the releasing angle is displaced from the second angle by substantially 5°.

67. The transport case (TC) according to claim 65, characterized in that the second angle is displaced from the first angle by substantially 85°.

68. The transport case (TC) according to claim 65, characterized in that the key can be removed from said locking mechanism only in the first state of thereof.

69. The transport case (TC) according to claim 60, characterized in that said locking mechanism further comprises an additional retaining means arranged to retain said handle in the retracted position thereof when said locking mechanism is in its first state; and said additional retaining means does not retain said handle in the retracted position thereof when said locking mechanism is in its second state.

70. The transport case (TC) according to claim 60, characterized in that said locking mechanism further comprises an opening button which when pushed opens the transport case (TC) unless said locking mechanism is in its first state.

71. The transport case (TC) according to claim 70, characterized in that said handle in its retracted position faces said opening button and can be pivoted onto said opening button to push said opening button such as to open the transport case (TC) unless said locking mechanism is in its first state; and said handle in its projecting position allows manual access to said opening button.

72. The transport case according to claim 60 wherein said locking mechanism comprises a key-operated locking system.

73. The transport case according to claim 60 wherein said base part is arranged to be detachably fitted to a carrier plate mounted on a motorbike.

74. A transport case (TC) comprising:

a base part arranged to be detachably fitted to a motorbike (MB);

a lid part hinged to said base part such that said lid part can be pivoted away from said base part to open said transport case (TC) and pivoted toward said base part to close said transport case (TC);

a locking mechanism comprising a key-operated locking system, said locking mechanism being selectively movable between a first state locking said lid part to the base part and a second state unlocking the lid part from the base part; and a handle articulated to said base part of said transport case (TC), in such a manner that said handle can be pivoted between a retracted position and a projecting position;

characterized in that said locking mechanism further comprises retaining means for retaining said handle in the retracted position: thereof; and said locking mechanism is arranged to selectively assume a release state in which said retaining means releases said handle from the retracted position thereof.

75. The transport case (TC) according to claim 74, characterized in that the release state of said locking mechanism is a third state thereof, and said retaining means are arranged to retain said handle in the retracted position thereof when said locking mechanism is in its first and second states.

76. The transport case (TC) according to claim 74, characterized in that said locking mechanism further comprises:

a closing mechanism arranged to selectively assume a first position holding said lid part to said base part and a second position not holding said lid part to said base part; and a lock member, said lock member being selectively movable between a first state locking said closing mechanism in the first position thereof, a second state unlocking said closing mechanism from the first position thereof, and a release state releasing said handle from the retracted position.

77. The transport case (TC) according to claim 74 characterized in that said handle is biased to its projecting position; and said locking mechanism is operable to assume the release state such as to release said handle automatically to the projecting position thereof.

78. The transport case (TC) according to claim 74, characterized in that said locking mechanism is operable to assume its release state against a resilient element.

79. The transport case (TC) according to claim 74, characterized in that the locking mechanism is operable by a key arranged to be turned selectively from a first locking angle to a second unlocking angle and to a releasing angle achieving the first, second and release states of the locking mechanism.

80. The transport case (TC) according to claim 79, characterized in that the releasing angle is displaced from the second angle by substantially 5°.

81. The transport case (TC) according to claim 79, characterized in that the second angle is displaced from the first angle by substantially 85°.

82. The transport case (TC) according to claim 79, characterized in that the key can be removed from said locking mechanism only in the first state of thereof.

83. The transport case (TC) according to claim 74, characterized in that said locking mechanism further comprises an additional retaining means arranged to retain said handle in the retracted position thereof when said locking mechanism is in its first state; and said additional retaining means does not retain said handle in the retracted position thereof when said locking mechanism is in its second state.

84. The transport case (TC) according to claim 74, characterized in that said locking mechanism further comprises an opening button which when pushed opens the transport case (TC) unless said locking mechanism is in its first state.

85. The transport case (TC) according to claim 84, characterized in that said handle in its retracted position faces said opening button and can be pivoted onto said opening button to push said opening button such as to open the transport case (TC) unless said locking mechanism is in its first state; and said handle in the projecting position thereof allows manual access to said opening button.

86. The transport case (TC) according to claim 74 characterized in that a wall portion of said base part comprises an aperture for receiving a fitting extension of a support structure of a motorbike (MB);

said base part comprises a latch mechanism arranged to assume a first position coupling said base part to a received fitting extension and a second position uncoupling said base part from a received fitting extension; and said latch mechanism is locked in its first position when said locking mechanism is in a locked-latch state, and said latch mechanism is unlocked from its first position when said locking mechanism is in an unlocked-latch state.

87. The transport case (TC) according to claim 86, characterized in that said latch mechanism is biased by a resilient element to the first position of said latch mechanism;

said latch mechanism is positively held in its first position and cannot be urged against the force of said resilient element when said locking mechanism is in the locked-latch state; and said latch mechanism comprises a detachment button by which said latch mechanism can be urged manually against the force of said resilient element to assume the second position of said latch mechanism when said locking mechanism is in the unlocked-latch state.

88. The transport case according to claim 87 wherein said resilient element comprises at least one spring.

89. The transport case according to claim 74 wherein said base part is arranged to be detachably fitted to a carrier plate mounted on a motorbike.

\* \* \* \* \*